N° 60.637
Peter Louis Imp'd Sprinkling Attachment for Brooms.
Patented
Dec. 18 1866
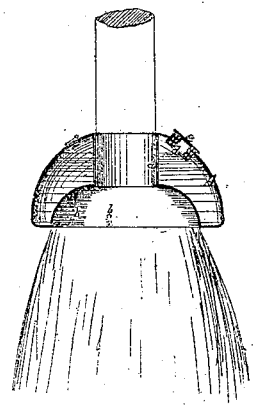
Witnesses.
Inventor.

United States Patent Office.

SPRINKLING ATTACHMENT FOR BROOMS.

PETER LOUIS, OF NEW YORK, N. Y.

Letters Patent No. 60,637, dated December 18, 1866.

---

The Schedule referred to in these Letters Patent and making part of the same.

---

TO ALL WHOM IT MAY CONCERN:

Be it known that I, PETER LOUIS, of the city, county, and State of New York, have invented a new and improved Sprinkling Attachment to Brooms; and I do hereby declare that the following is a full, clear, and exact description thereof, which will enable others skilled in the art to make and use the same, reference being had to the accompanying drawings, forming part of this specification.

The drawing represents a vertical central section of this invention.

This invention consists in the arrangement of a reservoir provided with a socket to fit a broom-stick, and furnished with a vent-valve in its upper side, and with a number of small holes in ts lower surface, in such a manner that by slipping said reservoir over a broom-stick on the but-end of a broom and filling it with water, the water will gradually trickle down over or through the broom, and a self-sprinkling broom is obtained, which obviates the necessity of sprinkling previous to commencing the operation of sweeping.

A represents a crescent-shaped reservoir, made of sheet metal or any other suitable material, and with a rounded edge, if desired, such as shown in the drawing. The concave bottom of this reservoir is made to fit the but-end of an ordinary broom, and said reservoir is provided with a socket, $a$, made to slip easily over a broom-stick of the usual size. The bottom of the reservoir is perforated with a number of small holes, $b$, and its top is provided with a vent-hole, $c$, which can be opened or closed by a suitable valve. An aperture $d$, which can be closed by a screw-plug $e$, allows of filling the reservoir with liquid or otherwise. After the opening $d$ is closed, and as long as the vent-hole is also closed, the liquid does not run out from the reservoir, but as soon as the vent-hole is opened the liquid trickles out through the holes, $b$, and the broom is moistened sufficiently to lay the dust. By this arrangement, the necessity of sprinkling previous to the operation of sweeping is rendered superfluous and a self-sprinkling broom is obtained, which is of great convenience and saves much time and labor.

Having thus described my invention, what I claim as new, and desire to secure by Letters Patent, is—

The within described sprinkling attachment for brooms, composed of reservoir A, provided with a socket $a$, a number of holes $b$ in its bottom, and with a vent-hole $c$ in its top, for the purpose herein set forth and described.

PETER LOUIS.

Witnesses:
WM. F. MCNAMARA,
ALEX. F. ROBERTS.